United States Patent [19]
Olson et al.

[11] 3,755,035
[45] Aug. 28, 1973

[54] ARTICLE, MOLD AND METHOD OF MAKING ARTICLE

[75] Inventors: Mark W. Olson, Allendale; Walter F. Silva, Riverdale, both of N.J.

[73] Assignee: Uniroyal, Inc., New York, N.Y.

[22] Filed: Feb. 22, 1971

[21] Appl. No.: 117,723

Related U.S. Application Data

[62] Division of Ser. No. 827,209, May 23, 1969, Pat. No. 3,635,623.

[52] U.S. Cl.............. 156/173, 156/196, 156/212, 156/245, 156/306, 219/211, 264/255, 264/313, 264/316
[51] Int. Cl............................................. B32b 31/20
[58] Field of Search.................... 156/245, 169, 306, 156/172, 173, 250, 256, 196, 212; 264/255, 254, 313, 316, 338; 425/123; 219/211, 355, 528, 544, 549

[56] References Cited
UNITED STATES PATENTS

| | | | |
|---|---|---|---|
| 3,555,140 | 1/1971 | Argereu | 264/255 |
| 2,284,078 | 5/1942 | Wiegand | 264/254 |
| 3,311,692 | 3/1967 | Baird | 264/313 |
| 3,557,276 | 1/1971 | Williams | 264/316 |
| 2,876,499 | 3/1959 | Schultz | 264/319 |

*Primary Examiner*—Daniel J. Fritsch
*Attorney*—Charles A. Blank

[57] ABSTRACT

A method for making an electrical heater in a mold having parallel ribs and grooves comprises moving a sheet of plastic material into the grooves of the mold, positioning a heater member in the grooves over the plastic material and moving a second sheet of plastic material into the grooves over the heater member in each case using sufficient heat to move said sheets of plastic material into the grooves.

2 Claims, 18 Drawing Figures

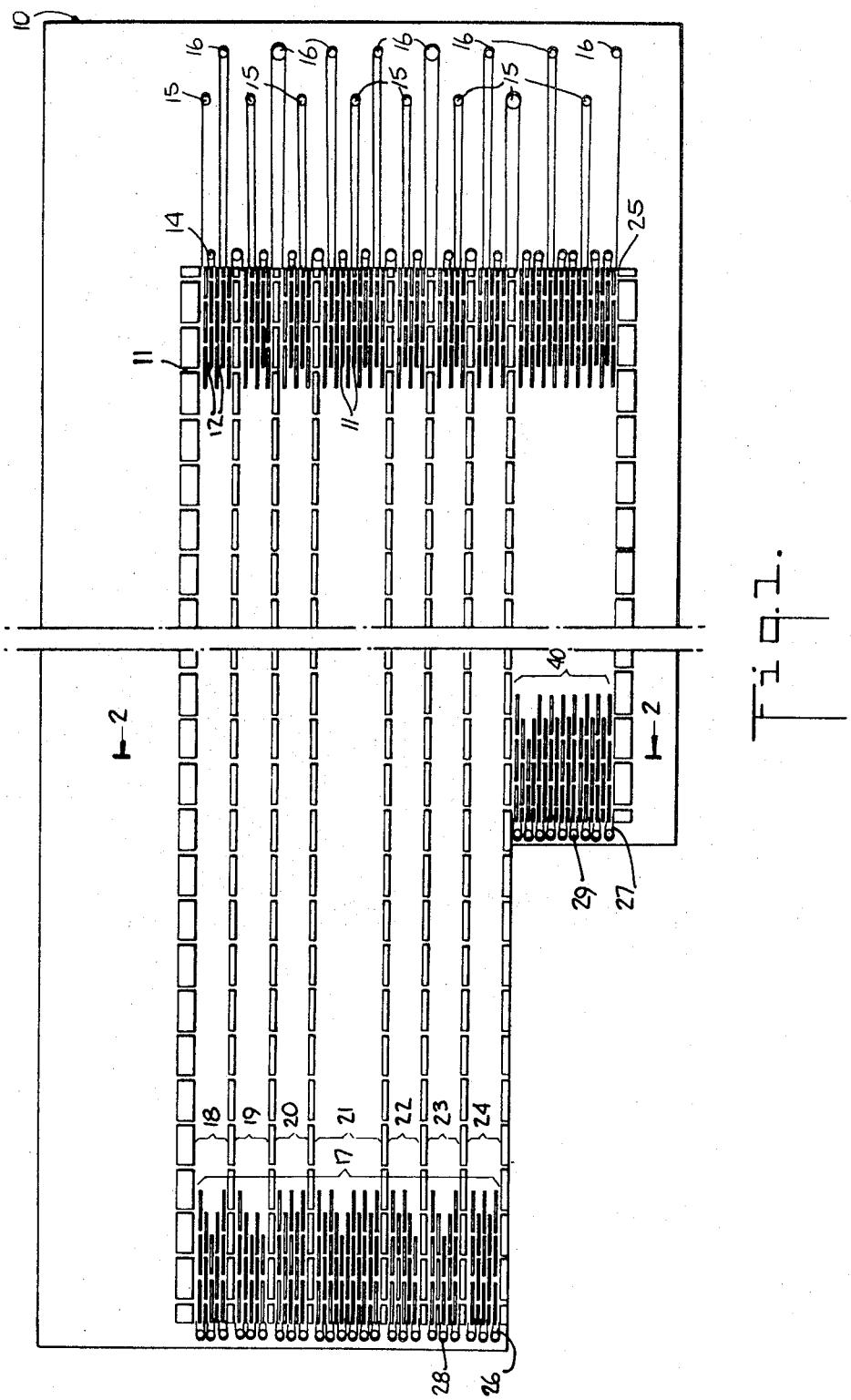

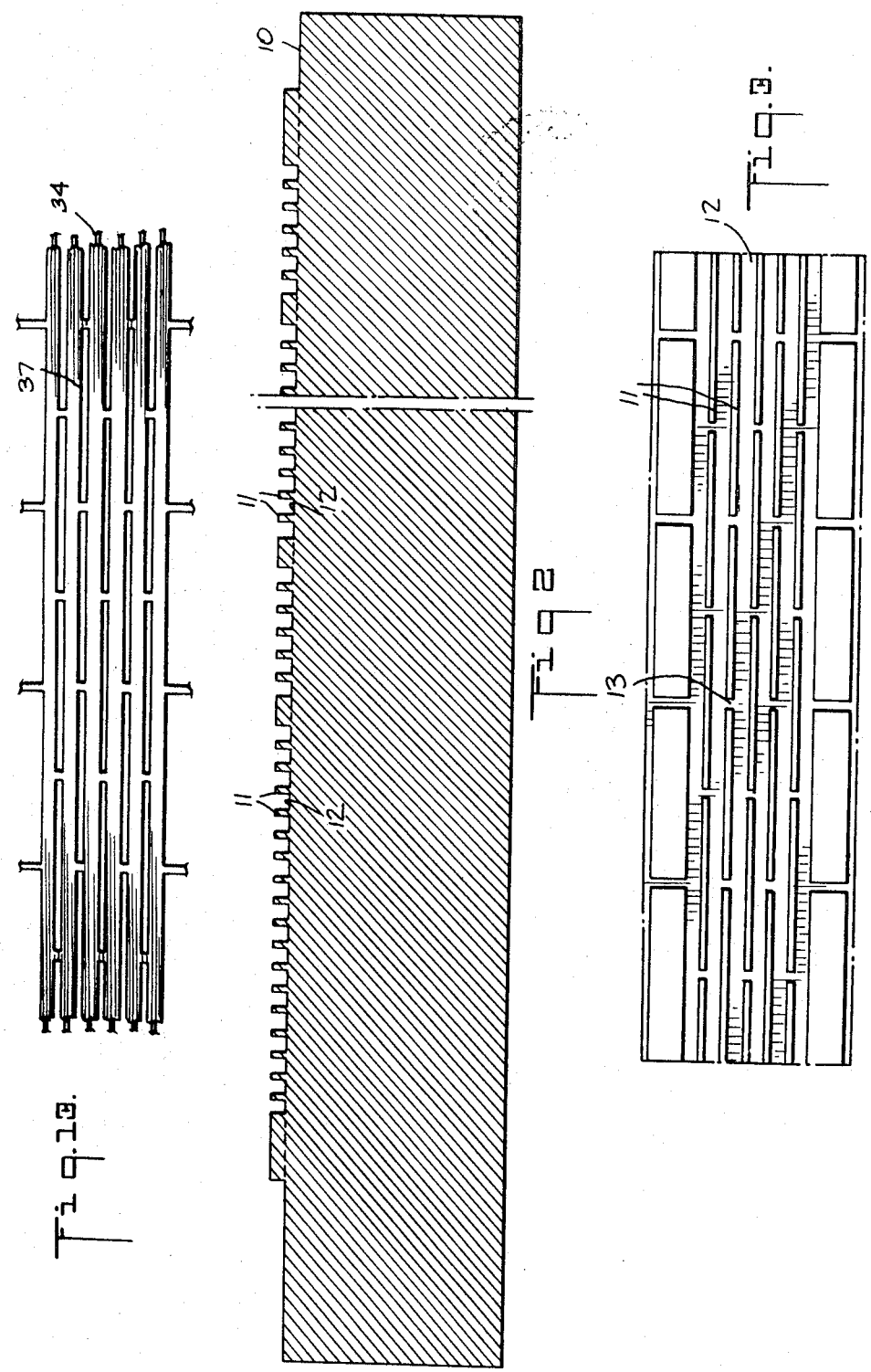

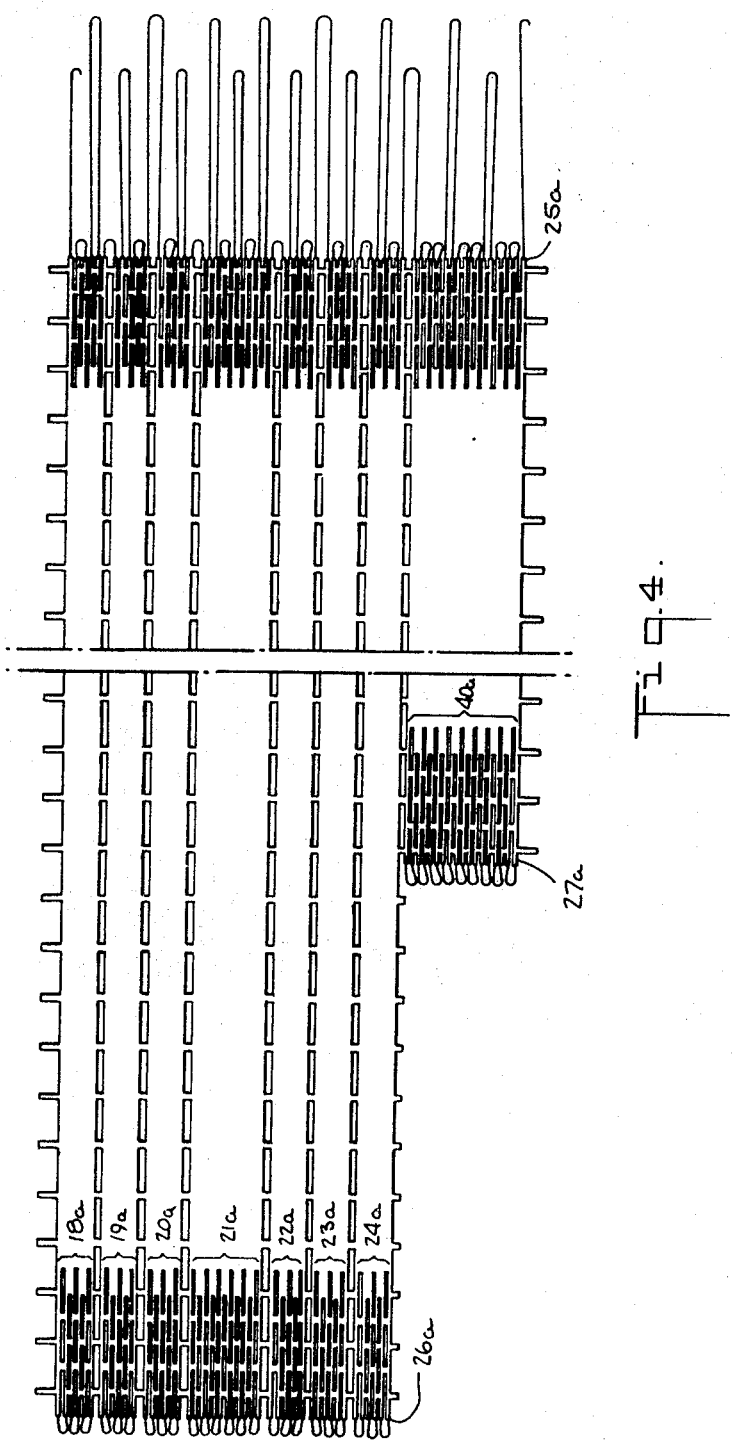

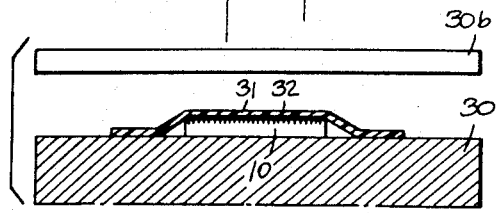
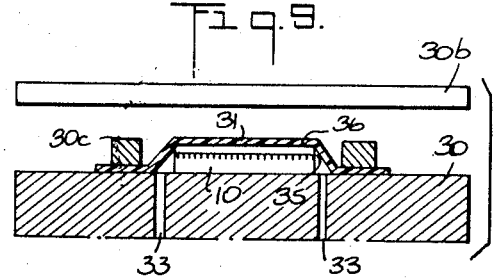
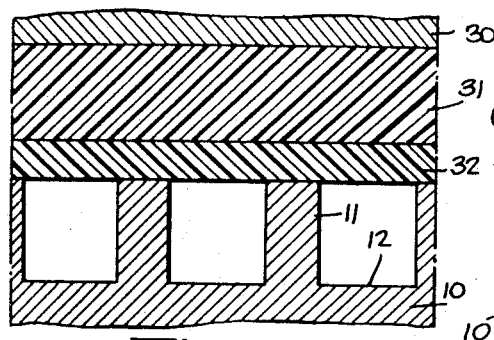
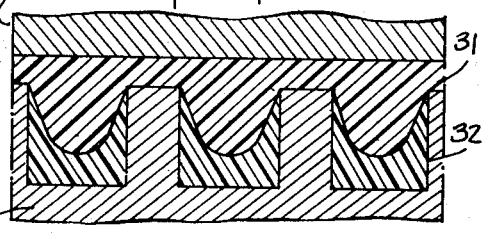
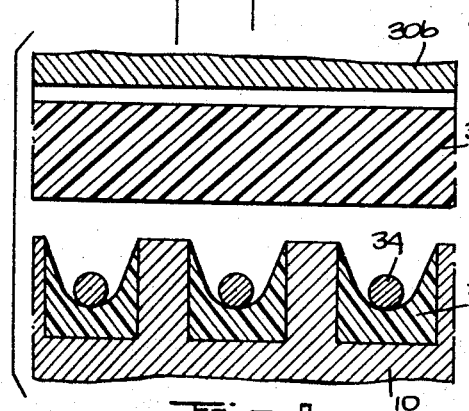
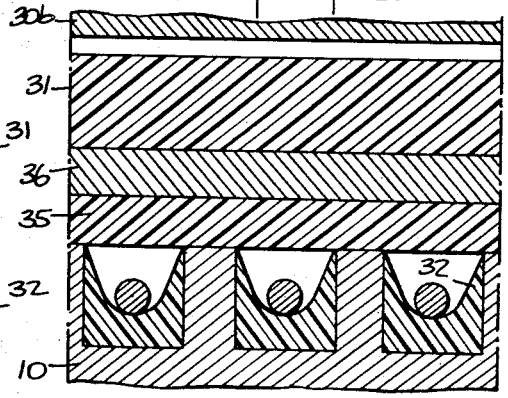
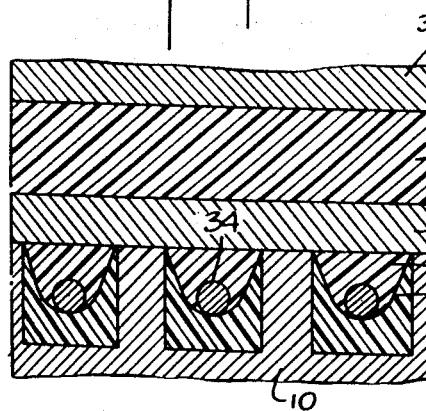
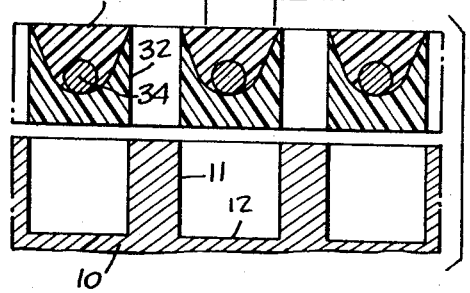

Patented Aug. 28, 1973

ARTICLE, MOLD AND METHOD OF MAKING ARTICLE

This application is a division of our copending application Ser. No. 827,209, filed May 23, 1969, now U.S. Pat. No. 3,635,623 issued Jan. 18, 1972.

This invention relates to an electrical heater, a mold for making the heater, and the method of making the heater.

The heater is suitable for use in heating a glove. Such a heater must be electrically insulated from the hand and should be flexible, durable and reliable. The heat should be effectively spread over the hand at a high temperature with little temperature change over various regions.

It is an object of the present invention, therefore, to provide a new and improved heater which is flexible, durable and reliable.

It is another object of the invention to provide a new and improved heater for a glove which uniformly heats the hand and uniformly heats the individual fingers.

It is another object of the invention to provide a new and improved mold for making a heater and a new and improved method of making the same.

It is another object of the invention to provide a new and improved mold for making a heater for a glove in which the heater wire is readily disposed in a predetermined pattern to provide a heater which substantially covers the hand and fingers individually.

It is another object of the invention to provide a new and improved method of making a heater readily and accurately.

In accordance with the invention, a heater comprises a flexible lattice structure of plastic material having an electrical heater wire embedded therein and extending continuously in adjacent lengths along the length of the lattice structure. The heater wire has a plurality of heater wire loops extending from the lattice structure and interconnecting the adjacent lengths of the heater wire for the application of electrical current thereto.

The invention also comprises a mold for making a heater utilizing electrical heater wire comprising a base having parallel rows of ribs and grooves with the ribs of one row displaced from the ribs of an adjacent row for molding plastic material in the grooves with the material extending between adjacent rows of grooves and with the ribs forming slits in the plastic material. The mold also includes pins disposed on the base and aligned with the rows of ribs for positioning electrical heater wire in the grooves and for adapting the lengths of heater wire extending to the pins for connections providing a plurality of electrical heater circuits in the heater wire.

The invention also comprises the method of making an electrical heater comprising positioning a first sheet of plastic material on a mold having parallel ribs and grooves, moving portions of the first sheet of plastic material into the grooves, and positioning a heater member in the grooves over the plastic material. The method also comprises positioning a second sheet of plastic material on the mold and moving portions of the second sheet of plastic material into the grooves over the heater member.

For a better understanding of the present invention, together with other and further objects thereof, reference is made to the following description taken in connection with the accompanying drawings and its scope will be pointed out in the appended claims.

Referring now to the drawings:

FIG. 1 is a fragmentary plan view of a mold constructed in accordance with the invention;

FIG. 2 is a fragmentary view, in section, to an enlarged scale, of the FIG. 1 mold taken along line 2—2 of FIG. 1;

FIG. 3 is a plan view, to an enlarged scale, of a portion of the FIG. 1 mold;

FIG. 4 is a fragmentary plan view of a heater made in the mold, upon removal from the press;

FIG. 5 is a sectional view, partly schematic, of a press utilizing the mold to make the heater;

Figure 13:
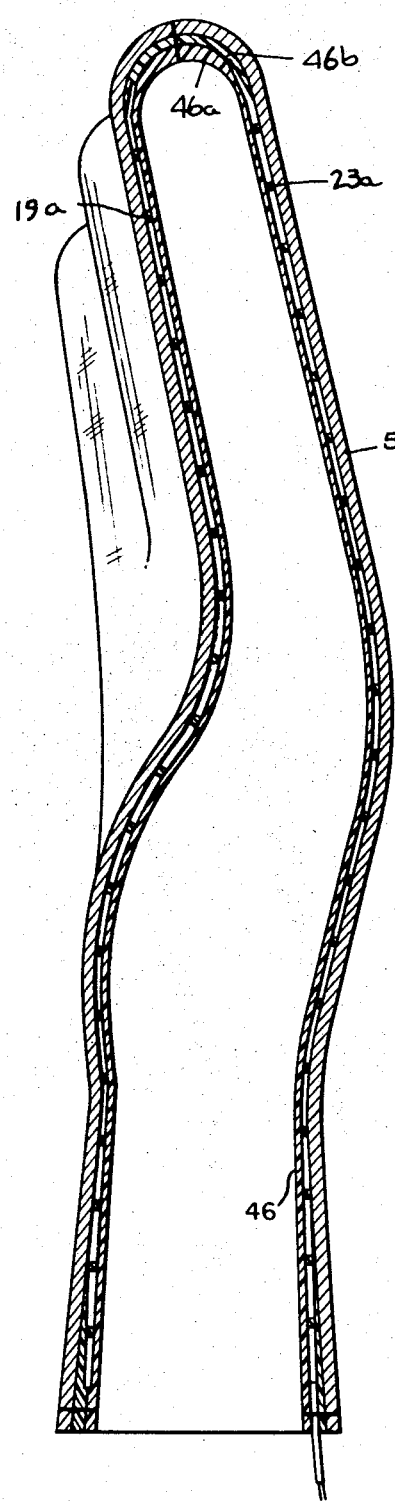
Figure 14:
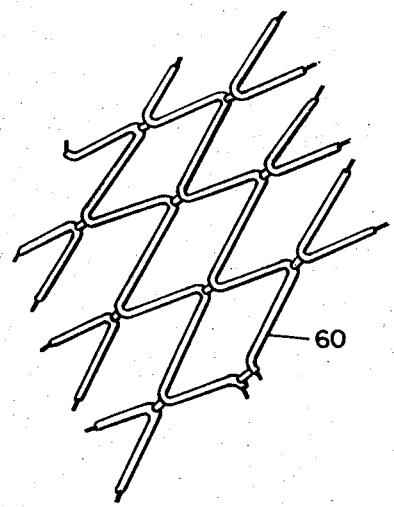
Figure 15:
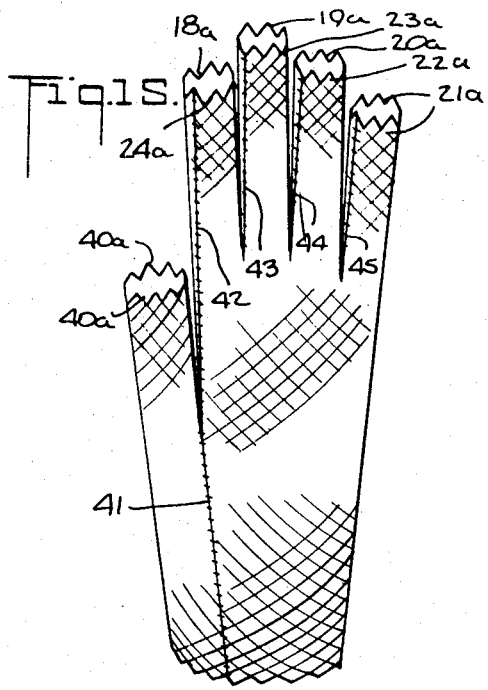
Figure 16:
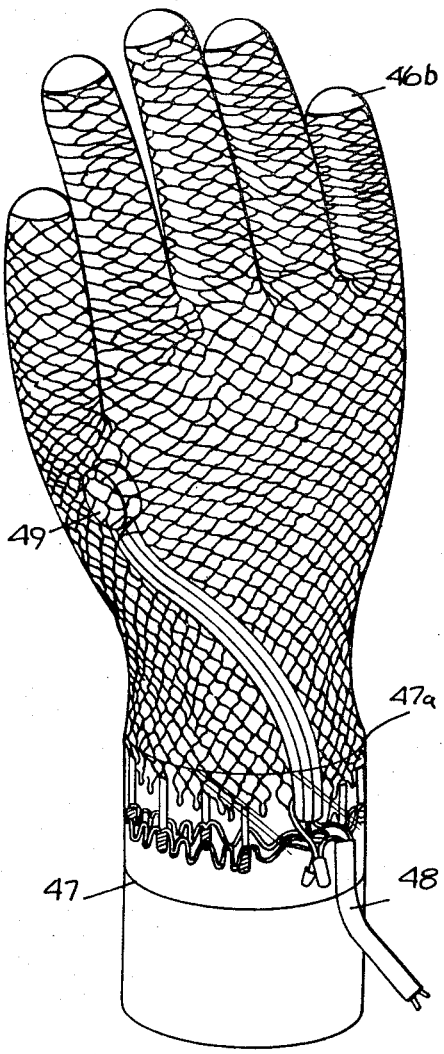
Figure 17:
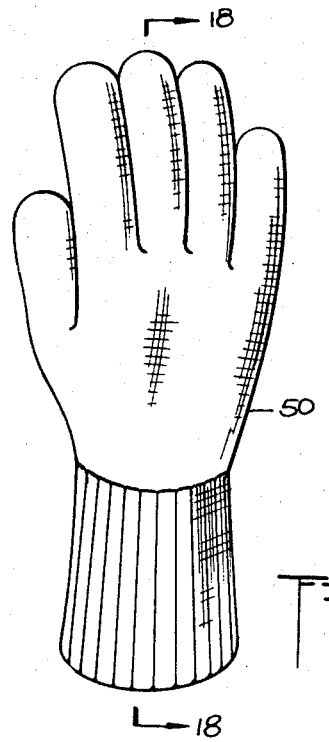

FIGS. 6–8, inclusive, are fragmentary sectional views, to an enlarged scale with respect to FIG. 5, representing the mold at various stages of manufacture of the heater;

FIG. 9 is a sectional view, partly schematic, of the press utilizing the mold for a second molding operation;

FIGS. 10–12 are fragmentary sectional views, to an enlarged scale with respect to FIG. 9, representing the mold during a second molding operation;

FIG. 13 is a fragmentary plan view of a heater made on the FIG. 3 mold portion;

FIG. 14 is a perspective view, to an enlarged scale with respect to FIG. 4, of a portion of the FIG. 4 heater upon lateral expansion thereof;

FIG. 15 is a fragmentary view of the heater, to a reduced scale with respect to FIG. 4, in the form of a glove made by lacing the edges of the FIG. 4 heater around a cardboard template;

FIG. 16 is a perspective view, to an enlarged scale with respect to FIG. 15, of the heater positioned over a suitable liner on a glove form;

FIG. 17 is a view of a glove, to a reduced scale with respect to FIG. 16, covering the heater and liner on the glove form;

FIG. 18 is a sectional view, to an enlarged scale with respect to FIG. 17, along line 18—18 of FIG. 17.

Referring now more particularly to FIGS. 1, 2 and 3 of the drawings, there is represented a mold 10 constructed in accordance with the invention for making an electrical heater. The mold comprises parallel rows of interrupted ribs 11 and grooves 12 between the ribs. The interrupted ribs of one row are displaced longitudinally from the interrupted ribs of a second row adjacent thereto for molding plastic material between the ribs with the plastic material extending along and interconnecting adjacent rows of grooves and with the ribs forming slits in the plastic material. For example, the grooves may be rectangular spaces between ribs having dimensions of one thirty-second inch by one thirty-second inch. The ribs individually may, for example, have a width of 0.010 inch. The grooves 12 are spaced from each other by, for example, 0.042 inch center-to-center. The grooves are interconnected by one thirty-second inch breaks 13 in the ribs that separate them. These breaks are spaced at three-eighths inch in each row of ribs and are staggered in adjacent rows.

The mold also includes pins 14 longitudinally aligned with the ribs and suitable for positioning heater wire in the grooves. Selected pins 15, 16 adapt the lengths of heater wire extending to the pins for connections to a source of current to provide a plurality of electrical heater circuits in the heater wire.

The mold 10 is suitable for making an electrical heater for a glove having thumb and finger regions in which the parallel rows of ribs 11 and grooves 12 have a first portion 40 corresponding to the thumb region and a second portion 17 corresponding to the finger region of greater width and greater length than the first portion 40. The first portion 40 is sufficiently wide to form a heater region which will extend around the thumb, and the second portion 17 is subdivided into portions 18 to 24, inclusive, sufficiently wide to form heater regions extending around approximately one-half of each finger other than the little finger. There are two finger heater regions for each finger except the little finger. The little finger heater region corresponding to mold portion 21 is sufficiently wide to extend around the little finger.

It should be understood that the ribs 11 and the grooves 12 of FIG. 1 extend along the entire length of the mold 10 between the end regions 25, 26 and between end regions 25, 27, continuing the pattern of parallel ribs and grooves which is indicated in each end region of the drawing. It should also be understood that in FIG. 1 the wires extending to pins 14, 15, 16, 28, 29 beyond the end regions 25, 26 and 27 of the mold are not part of the mold structure but represent wire extensions of the heater which is otherwise omitted from the view of FIG. 1.

In accordance with the invention, the method of making a heater comprises positioning a mold having parallel ribs and grooves in a press. Referring to FIG. 5, mold 10 is positioned on a press platen 30 over which is placed a sheet of plastic material 32 and, for example, a sheet of silicone rubber 31. When suitably heated, the upper platen 30b is closed against rubber sheet 31, causing the sheet 31, acting as a soft plate, to press the sheet of plastic material 32 into the grooves of the mold. This operation may be more clearly seen with reference to FIGS. 6, 7 and 8 wherein the ribs 11 of the mold and the grooves 12 thereof are represented in section.

Referring to FIG. 6, the plastic sheet material 32 is disposed over the ribs 11 and grooves 12 under the silicone rubber sheet 31. On closing the press, the rubber sheet 31 forces the plastic material 32 into the grooves 12, providing a U-shaped surface for the plastic material 32 as represented in FIGS. 7 and 8. As also represented in FIG. 8, the heater wire 34 may be readily wound continuously in the mold, centering itself in the lowest region of the plastic material 32. The heater wire may, for example, comprise 49 nickel-chrome alloy filaments individually of 0.0008 inch diameter with the wire covered by a silk coating to prevent the filaments from fraying.

Referring now to FIG. 9, a second sheet of plastic material 35 may be positioned on the mold under a rigid metal plate 36 under the silicone rubber sheet 31. Here, a vacuum type press is shown in which the silicone rubber sheet 31 forms a seal for the molding operation. Frame 30c holds edges of the sheet tightly against platen 30 and air is evacuated through vents 33 which extend through the latter. Referring to FIGS. 10, 11 and 12 it will be seen that when the press is heated and closed and the air is evacuated the hard plate 36 forces the second sheet of plastic material into the grooves over the heater wire 34. The heater wire 34 in its surrounding plastic covering may then be removed from the mold, as represented in FIG. 12. Heat applied during the first and second moldings of the plastic material; for example, 330°F, would be adjusted to suit the plastic used. The remaining operations of shaping and forming the heater into the shape of a glove may be performed at a considerably lower temperature, for example, 200°F.

Referring for the moment to FIG. 13, a fragmentary portion of a heater made, in accordance with the foregoing description, on the mold portion of FIG. 3 is there represented. Thus, the ribs 11 of the mold form longitudinally extending apertures or slits 37 which are displaced from each other laterally and can be opened by lateral movement to form a flexible lattice structure of plastic material having an electrical heater wire embedded therein with a plurality of circuit terminals extending from the lattice. In FIG. 14 there is represented, in perspective, a lattice structure 60, for example, forming a portion of the heater of FIG. 13.

The heater of FIG. 4, which has a continuous pattern extending between end regions 25a, 26a and 25a, 27a, may be severed along the wider slit portions separating the regions 18a–24a, inclusive, and 40a. This severance extends longitudinally substantially equal to the lengths of the fingers in the finger region of the glove and to the length of the thumb in the thumb region of the glove. The heater may then be formed on a suitable cardboard template and shaped as represented in FIG. 15 to form a flexible lattice structure having thumb and finger regions and folded over itself in the region of the thumb and folded over itself in the region of the little finger. The other finger regions of the lattice structure comprise half finger regions 18a, 19a, 20a, represented in FIG. 4, positioned against corresponding half finger regions 24a, 23a, 22a, respectively, and joined to form the other three fingers of the heater. The heater thumb and finger regions may be laced as indicated along lines 41–45, inclusive, of FIG. 15.

A suitable liner 46 of, for example, Nylon having high circumferential stretch but low axial stretch, is placed on the glove form. As represented in FIG. 16, the lattice structure, which is capable of being opened laterally to provide high lateral stretch, is stretched over the liner and set in this configuration. The lattice structure also preferably is spot tacked to the liner, for example, by hand stitching or by using an adhesive.

The fingertip and thumb tip regions of the liner are covered with a plastic material 46a, for example, polyurethane, to insulate the wire loop ends of the heater from the hand and to allow cementing of the heater ends to the liner. A second layer 46b of polyurethane is cemented over the fingertip and thumb tip regions and to form a watertight covering for the loop ends of the heater. A broader strip of plastic film 47 is fastened to the liner for similar purposes at the wrist. The short loop ends are cemented to the film 47 and the longer loop ends are stripped of the silk coating and are connected electrically to the input lead wires 48 by suitable crimped joints. Both the uninsulated heating wire and crimped joints preferably then are covered with suitable insulation, for example, plastic shrink-type tubing. A thermostat 49 may also be connected in series with one of the lead wires 48. Each of the loops formed around pins 15 of FIG. 1 is connected to one of the lead wires 48 of FIG. 16 and each of the loops formed around pins 16 of FIG. 1 is connected to the other lead wire 48. A second overlying sheet of plastic film 47a may be used to complete the insulation of the loop ends and wire conductors and to form a water-tight envelope around the electrical connections. A 12-volt battery circuit (not shown) may be utilized to supply current to the heater under the control of the thermostat 49.

As represented in FIGS. 17 and 18, the heater and liner may, for example, be covered by a suitable woolen glove 50 which may be sewn to the liner at the finger tips and wrist locations.

The following parameters represent as an example parameters of a glove constructed in accordance with the invention:

| | |
|---|---|
| Heating wire resistance | 25.5 ohms per foot |
| Length of single heating circuit | 5.65 feet |
| Resistance of single heating circuit | 144 ohms |
| Wattage of single heating circuit | 1 watt |
| Number of parallel heating circuits | 3 per finger 15 per glove |
| Wattage of glove | 15 watts |
| Overall glove heater resistance | 9.6 ohms |
| Total heating wire per glove | 85 feet |

Sheets of, for example, thermoplastic polyurethane, each having a thickness of 0.010 inch, are suitable for insulating the heater wire, being flexible at room temperature and readily moldable at elevated temperature.

While there has been described what is at present believed to be the preferred embodiment of the invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. The method of making an electrical heater in a mold having parallel rows of elongated, slotted ribs and having spaced, interconnected, intervening grooves with pins disposed at both ends of said grooves comprising the steps of:

positioning a first sheet of plastic material on the mold;

backing said first sheet of plastic material by a flexible sheet;

compressing said flexibly backed plastic sheet against the mold and applying sufficient heat to said plastic material to force said plastic material into said grooves only partially to fill said grooves with said plastic material having generally U-shaped surfaces;

winding a heater member continuously in said grooves and around said pins to position said heater member in the lowest region of said generally U-shaped surfaces of said plastic material;

positioning a second sheet of plastic material on the mold;

backing said second sheet of plastic material by a rigid plate;

compressing said rigidly backed plastic sheet against the mold and applying sufficient heat to said plastic material of said second sheet to force said plastic material of said second sheet into said partially filled grooves and over said heater member, completely to fill said grooves, whereby said heater member is embedded in and surrounded by plastic material in said grooves.

2. The method in accordance with claim 1 for making an electrical heater having thumb and finger regions for a glove which includes the steps of partially separating the thumb and finger regions of the heater.

* * * * *